US011309100B1

(12) United States Patent
Ganguli et al.

(10) Patent No.: US 11,309,100 B1
(45) Date of Patent: *Apr. 19, 2022

(54) HIGHLY CONDUCTIVE STRAIN RESILIENT MATERIAL AND METHOD FOR MAKING THE MATERIAL

(71) Applicant: Government of the United States as represented by the Secretary of the Air Force, Wright-Patterson AFB, OH (US)

(72) Inventors: Sabyasachi Ganguli, Beavercreek, OH (US); Ajit K Roy, Beavercreek, OH (US); Chenggang Chen, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,612

(22) Filed: Sep. 10, 2020

Related U.S. Application Data

(63) Continuation of application No. 16/118,353, filed on Aug. 30, 2018, now Pat. No. 10,854,351.
(Continued)

(51) Int. Cl.
*H01B 1/04* (2006.01)
*C22C 26/00* (2006.01)
*B82Y 30/00* (2011.01)

(52) U.S. Cl.
CPC .......... *H01B 1/04* (2013.01); *B22F 2302/403* (2013.01); *B82Y 30/00* (2013.01); *C22C 2026/002* (2013.01)

(58) Field of Classification Search
CPC ...... B82Y 30/00; B22F 2302/403; H01B 1/04
(Continued)

(56) References Cited

U.S. PATENT DOCUMENTS 3,842,023 A    10/1974  Sastry et al.
6,271,482 B1   8/2001   Crotzer et al.
(Continued)

FOREIGN PATENT DOCUMENTS

CN        101407637 A    4/2009

OTHER PUBLICATIONS

Yang "Nanospot welding of carbon nanotubes using nearfield enhancement effect of AFM probe irradiated by optical fiber probe laser."RSC Adv., 2015, 5, 56677 (Year: 2015).*
(Continued)

*Primary Examiner* — Tri V Nguyen
(74) *Attorney, Agent, or Firm* — AFMCLO/JAZ; James F McBride

(57) ABSTRACT

An electrically conductive, flexible, strain resilient product is produced by mixing metal coated carbon nanotube networks with a liquid polymeric resin to produce a liquid mixture, and the mixture is cured to produce the product. The networks may include welded junctions between nanotubes formed by depositing and melting metal nanoparticles on the nanotubes to form the metal coating. After the mixing step the liquid mixture may be deposited on a flexible substrate in the form of an electrical circuit. The mixing step may further include mixing the composite with a volatile solvent to produce a selected viscosity. Then, a three-dimensional printer may be used to print the product, such as an electrical circuit, on a substrate. The product is cured in an atmosphere that absorbs the solvent. The conductivity of the mixture may be adjusted by adjusting the weight percentage of the metal coated carbon nanotube networks
(Continued)

from 50% to 90%, but a preferred range is between 75% and 85%.

4 Claims, 3 Drawing Sheets

Related U.S. Application Data

(60) Provisional application No. 62/552,656, filed on Aug. 31, 2017.
(58) Field of Classification Search
USPC ........ 977/742, 932, 847, 773; 252/500, 506, 252/510, 511
See application file for complete search history.

(56) References Cited

U.S. PATENT DOCUMENTS

| | | |
|---|---|---|
| 6,398,899 B1 | 6/2002 | Umezawa et al. |
| 2012/0251824 A1 | 10/2012 | Hur et al. |
| 2015/0129808 A1 | 5/2015 | Mrozek |
| 2018/0214991 A1* | 8/2018 | Yahata ................ B23K 35/325 |

OTHER PUBLICATIONS

Lin "In-Situ Welding Carbon Nanotubes into a Porous Solid with Super-High Compressive Strength and Fatigue Resistance." Scientific Reports, 5, 11336. (Year: 2015).*

Chen, C.; Ganguli, S.; Roy, A. K.; Foley, J.; High Conductive Polymer Nanocomposite Application Interconnects and Traces, MRS Advance, Available on CJO 215 doi; 10.1557/adv.2015.37, published online Dec. 28, 2015.

Vaia, R. A.; Giannelis, E. P.; Polymer Nanocomposites: Status and Opportunities; MRS Bulletin; May 2001; p. 394-401.

Yao, S.; and Yong Zhu, Y.; Nanomaterial-Enabled Stretchable Conductors: Strategies, Materials and Devices; Advanced Materials www.advmat.de; www.MaterialsViews.com; Department of Mechanical and Aerospace Engineering, North Carolina State University, Raleigh, NC 27695-7910, USA; 2015 WILEY-VCH Verlag GmbH & Co. KGaA, Weinheim; Adv. Mater. 2015, 27, 1480-1511.

X.Luo, D.D. L. Chung; A comparative study of silver-expoxy and tin-lead solder in their joints with copper, through mechanical and electrical measurements during debonding; Composite Materials Research Laboratory, State University of New York at Buffalo, Buffalo, NY 14260-4400; Journal of Materials Science 34 (1999) 273-276.

Peter N. Nirmalraj, P.N.; Lyons, E L.; Sukanta, D.; Coleman, J. N.; Boland, J. J.; Electrical Connectivity in Single-Walled Carbon Nanotube Networks, Nano Letters, 2009, vol. 9, No. 11 3890-3895.

Lit, E. Y.; Marzari, N.; Improving the Electrical Conductivity of Carbon Nanotube Networks: A First-Principles Study, Nano, 2011, vol. 5, No. 12, 9726-9736.

Ko, W.; Lin, K.; Highly Conductive, Transparent Flexible Films Based on Metal Nanoparticle-Carbon Nanotube Composites. Journal of Nanomaterials, 2013, vol. 2013, Article ID 505292, 16 pages.

Rodrfguez-Manzo, J. A.; Wang, M.; Banhart, F.; Bando, Y.; Golber, D ; Multibranched Junctions of Carbon Nanotubes via Cobalt Particles Adv. Mater. 2009, 21, 4477-4482.

* cited by examiner

HIGHLY CONDUCTIVE STRAIN RESILIENT MATERIAL AND METHOD FOR MAKING THE MATERIAL

CROSS REFERENCE TO RELATED APPLICATIONS

The present application is a continuation of and claims priority to U.S. patent application Ser. No. 16/118,353 filed Aug. 30, 2018, which in turn claims priority to Provisional Application Ser. No. 62/552,656, filed Aug. 31, 2017, both such priority applications being incorporated by reference herein as if fully set forth herein.

FIELD

This invention relates to the field of flexible resilient electrically conductive materials and methods for making the material. More particularly, this invention relates to such material constructed with carbon nanotube networks.

BACKGROUND

Electrical circuits include electrical transmission paths or traces that are typically made of metal, and such traces are susceptible to failure due to strain and flexing of the traces in high impact environments such as aerospace environments. The connection points between traces and electrical components on a conventional circuit typically include metal to metal bonds (such as a soldered connection) that are particularly susceptible to failure due to strain and flexing of the materials used to make the connection. Of course, conventional electrical circuits have been designed and protected so as to survive high impact environments, but the current invention involves the recognition that such circuits could be improved by the use of highly electrically conductive, strain resilient, flexible material and such materials are disclosed as well as methods for making the material and for making circuits using such material.

In accordance with one embodiment, an electrically conductive, strain resilient, flexible material is made by first providing metal coated carbon nanotube (CNT) networks. The metal is disposed in and proximate to junctions between individual nanotubes, including point junctions and sidewall-to-sidewall junctions. In one embodiment, the metal forms welded junctions between the nanotubes. The metal coated carbon nanotube networks are mixed with a liquid polymeric resin to produce a mixture and the liquid mixture is cured to produce the electrically conductive, strain resilient, flexible material.

After the mixing step, the liquid mixture may be deposited on a flexible substrate and allowed to cure to produce a flexible, electrically conductive, strain resilient electrical circuit on the substrate. The mixing step may also include mixing the liquid polymeric resin and the metal coated nanotube networks with a volatile solvent to produce a liquid measure having a selected viscosity. After this mixing step, the liquid mixture may be printed onto a flexible substrate using a three-dimensional printer that is configured to print with the material of the selected viscosity to produce a printed mixture on the substrate. The printed mixture on the substrate is then cured for a curing period of time in an atmosphere that absorbs the solvent so that, after the curing period, the solvent evaporates from the printed mixture to produce a solid, flexible, strain resilient electrically conductive polymeric electrical circuit on the flexible substrate.

The metal coated carbon nanotube networks may be made by first providing a CNT network, such as a CNT yarn with highly aligned nanotubes that form both point contact junctions and sidewall-to-sidewall junctions between nanotubes. Nanoparticles of metal are deposited on the CNT network such that at least some junctions are surrounded by the metal nanoparticles to produce a metal coated CNT network that is then heated to a temperature that is sufficient to melt the nanoparticles of metal but insufficient to damage the CNT network. The melting of the nanoparticles produces welds between the junctions that are highly conductive of both electricity and heat. As a specific example, for gold nanoparticles created by laser pulse laser sputtering, the melting temperature is about 200 degrees C., and thus the gold metal coated CNT network may be heated to about 250 degrees C. to melt the gold nanoparticles without damaging the CNT network. A CNT network is typically damaged by temperatures of about 550 degrees C., and so the heating temperature for any metal coated CNT network should be below 550 degrees C., and preferably well below 550 degrees C. The type of metal and the size of the nanoparticles used in this method should be selected to provide a melting temperature of the metal nanoparticles that is below 550 C, and preferably well below 550 degrees C.

In accordance with a particular embodiment, the flexible product is produced to have a selected conductivity by adjusting the amount of the metal coated nanotube networks in the liquid mixture relative to the amount of the liquid polymeric resin. By increasing the relative amount of the metal coated carbon nanotube networks, the conductivity of the flexible product is increased. The weight percentage of the metal coated nanotube networks in the liquid mixture may be adjusted between 50% to 90%, but more preferably between 75% and 84%.

In accordance with another aspect of the invention, the flexible product may be produced to have a selected storage modulus by adjusting the weight percentage of the metal coated nanotube networks in the liquid mixture. The flexibility of the product is inversely proportional to the storage modulus. Likewise, the strain resiliency is inversely proportional to the storage modulus.

In accordance with a particular embodiment, the metal coated carbon nanotube networks may be coated with a metal selected from the group of silver, gold or titanium. The mixing step may include three-roll-milling and/or mixing with a planetary centrifugal mixer. Further, the mixing step may include degassing the liquid mixture with vacuum.

The material produced by the methods described above are considered embodiments of the invention. In particular, a strain resilient electrical connector material comprises metal coated carbon nanotube networks disposed in a solid polymer, and the weight percentage of the metal coated carbon nanotube networks in the material is between 75% and 84%. Preferably, the strain resiliency of the material in a solid state is greater than 34%, the storage modulus of the material in a solid state is greater than 4.5 GPa, and the conductivity of the material is greater than $6 \times 10^4$ S/cm.

In accordance with another embodiment, an electrical connector material comprises a mixture of metal coated carbon nanotube networks mixed with a liquid comprising an uncured polymer, and the liquid is selected and proportioned to produce a mixture having a viscosity suitable for use in a printer. Preferably the weight percentage of the liquid in the mixture is chosen to have a viscosity of less than $10^3$ poise. In accordance with another embodiment, the liquid further comprises a volatile thinner and the weight percentage of the liquid (excluding the thinner) in the mixture is selected to produce a viscosity of less than $10^5$ poise.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
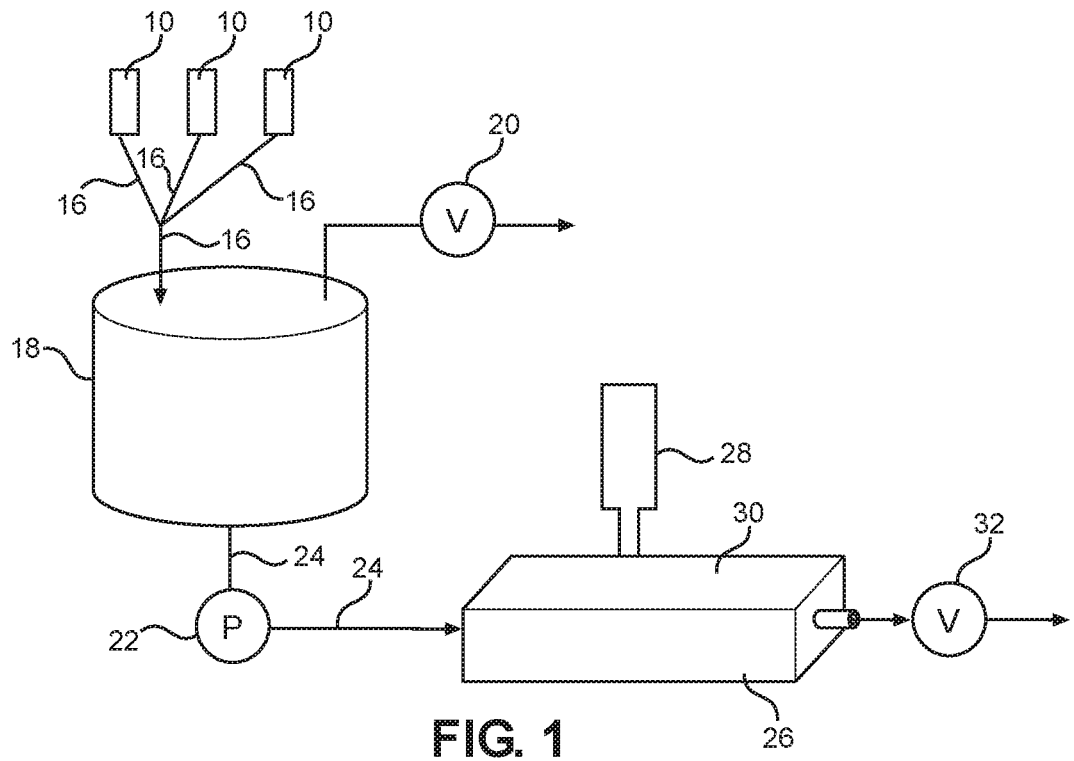
FIG. 1 is a somewhat diagrammatic illustration of an apparatus for mixing and curing the composite.

Commercial electronic products used in aerospace applications are not specifically designed to perform in extremely transient high impact scenarios. Future electronic device packaging to perform in high impact scenarios need to exhibit and meet electrical performance along with mechanical deformability (flexibility). The materials described herein have an elastomeric matrix with nanoconstituents forming a percolated electrically conductive network and therefore exhibit very high electrical conductivity, flexibility, and shock absorption. As used herein, flexibility is used in accordance with its normal English definition and it means that the material can flex and maintain its electrical integrity in a high impact environment such as an aerospace application.

In accordance with one embodiment of the invention, carbon nanotubes (CNT) are used as building blocks for the next generation of multifunctional low density, highly conductive, materials having improved interfacial connectivity between the CNT. The thermal and electrical conductivity of CNT-based materials are improved by incorporating metal nanoparticles at CNT junctions, which also enhances mechanical stability. CNT yarn is a good starting material because of its intrinsically high thermal and electrical transport along the CNT longitudinal axial direction due to the good alignment of the CNT and extensive tube-tube overlap of the individual CNT in this material. The best mechanical, thermal and electrical properties for CNT yarn reported to date have been achieved without enhancement of the weak van der Waals interactions of the CNT sidewalls.

To improve interfacial thermal and electrical transport, metallic particles are introduced between the junctions of the nanotube, including the point junctions and the sidewall-sidewall contacts of adjoining CNTs. In one embodiment gold particles are used. In order to promote mass transfer of the metal used for CNT sidewall bonding at lower temperatures, Au (gold) nanoparticles were deposited on vertically aligned multiwall carbon nanotube (MWCNT) arrays via pulsed laser deposition. One reason for the deposition of the metal nanoparticles was to suppress (lower) the meting point of the metal as compared to the bulk melting point to about 250° C. Bulk gold melts at about 1200 degrees Celsius, but nanoparticles of gold will melt at a temperature of less than 250° C. Heating this engineered nanotube network results in welded nanotube junctions which, when dispersed in a flexible amorphous polymeric matrix, imparts superior thermal and electrical transport properties to the nano-engineered CNT-polymer composite which we use as strain resilient electrical interconnect, traces and solders. By volume, the percentage of gold in the metal coated CNT network is about ten percent, but more or less gold will still produce a highly conductive practical material. Other metals may be used to produce the composite, and preferred metals are silver, gold, titanium, and gallium.

To produce the composite, the metal coated CNT network is interspersed or mixed with a polymer to produce an electrically conductive flexible composite. In one embodiment, the metal coated network is heated to create welded junctions as discussed above, but metal coated networks without welded junctions may also be used to produce the polymer composite. Examples of appropriate polymers are thermosetting epoxy polymer and thermoplastic polyurethane. One specific example is Epon 828 (an undiluted clear difunctional bisphenol A/epichlorohydrin derived liquid epoxy resin), Jeffamine D2000 (a polyether amine epoxy hardener), which is mixed with the metal coated CNT network to produce the polymer composite. In addition to the polymer material, the mixtures may include solvents to provide a desired viscosity for working or applying the mixture to a substrate or other object. However, the solvents will typically be removed (evaporated) from the final product during curing. Suitable solvents include: acetone, N,N-Dimethylformamide, toluene, tetrachloroethylene.

The electrical and heat conductivity of the polymer composite increases with increasing percentages of the metal coated CNT network, but the flexibility and resiliency of the polymer composite decreases with increasing percentages of the metal coated CNT network. Excluding solvents, the weight percentage of metal coated CNT network in the polymer composite may be varied between 50% and 90%, but most preferably the range will be within 75% to 85%. If a particular application demands a particular low viscosity, the solvents mentioned above may be added to achieve the desired viscosity. Material destined for high impact environments should have a strain resiliency of greater than 34 percent, and in a preferred embodiment, the storage modulus of the composite is greater than 4.5 GPa, and the conductivity is greater than $6 \times 1.0^4$ S/cm.

As used herein "epoxy" or "epoxy polymer" includes both the epoxy resin and the epoxy hardener. Unless context requires a different meaning, the terms "material", "composite" and "mixture" are synonyms when applied to the material of the invention and do not imply differences. One processing procedure for these mixtures includes the combination of three-roll-milling and Thinky mixing. The Thinky mixing means using a Thinky brand mixer (a planetary centrifugal mixer), followed by degas under vacuum. Then the mixture is then cast in a silicone mold and cured in the autoclave (75° F. to 250° F. at the ramp rate of 2° F./min., held at 250° F. for 3 hours, then cooled down to 75° F. The vacuum in the mold is kept at −28 inch Hg and a physical pressure was applied to the mixture in the mold and kept at +100 psi during curing). This procedure is appropriate for use with the gold coated CNT networks mixed with the epoxy polymer.

In the above examples, gold is used as the metal to coat the CNT network, but other metals could be used in substitution for the silver. For example, silver, titanium, platinum, or gallium would also be good metals for use as a coating for the carbon nanotube networks. Superior performance in conductance and small size may be achieved by using carbon nanotube networks in a polymer composite. Carbon nanotubes with small diameters (in the range of 6 to 8 on the chirality index) are better for electrical conductance of the overall composite. In general, the conductance of the composite increases as the diameter of the nanotube gets smaller. In other words, conductance is inversely proportional to the diameter of the nanotube. For maximum conductance, the smallest or thinnest possible carbon nanotube produces the most conductive composite.

The process of producing the composites described above may be further understood by reference to FIG. 1 schematically illustrating the process of mixing and forming the composite using a mold. Supply mechanisms 10 represent conventional supply mechanisms that are used to supply liquids or solids (including powders) through multiple lines 16 to a mixer 18. Although only three supply mechanisms 10 are shown in the figure, it will be understood that the three supply mechanisms 10 represent any number of supply mechanisms. For example, when an epoxy composite is produced, a supply mechanism may be needed for each of the following mixture components: metal coated CNT networks, epoxy resin, epoxy hardener, and a solvent. The supply mechanisms meter the mixture components so as to provide the correct percentage of each component. After the components are delivered to the mixer 18, the composition is mixed and degassed as desired. For example, the mixer 18 may represent a three-roll-milling processor and a Thinky mixer (planetary centrifugal mixer). During the mixing process and after the mixing process a vacuum may be applied to the composite by the vacuum pump 20 to degass the composite. Thus, the mixer 18 also represents a vacuum chamber. After the mixing and degassing is complete, a pump 22 delivers the composite through lines 24 to a mold 26. After the mold is filled to capacity, a top plate 30 is pressed against the composite in the mold by a hydraulic ram 28. Also, a vacuum is applied to the mold by pump 32. The mold 26 is also supplied with heaters, not shown, that control the temperature of the composite in the mold as it cures as previously described.

Figure 2:
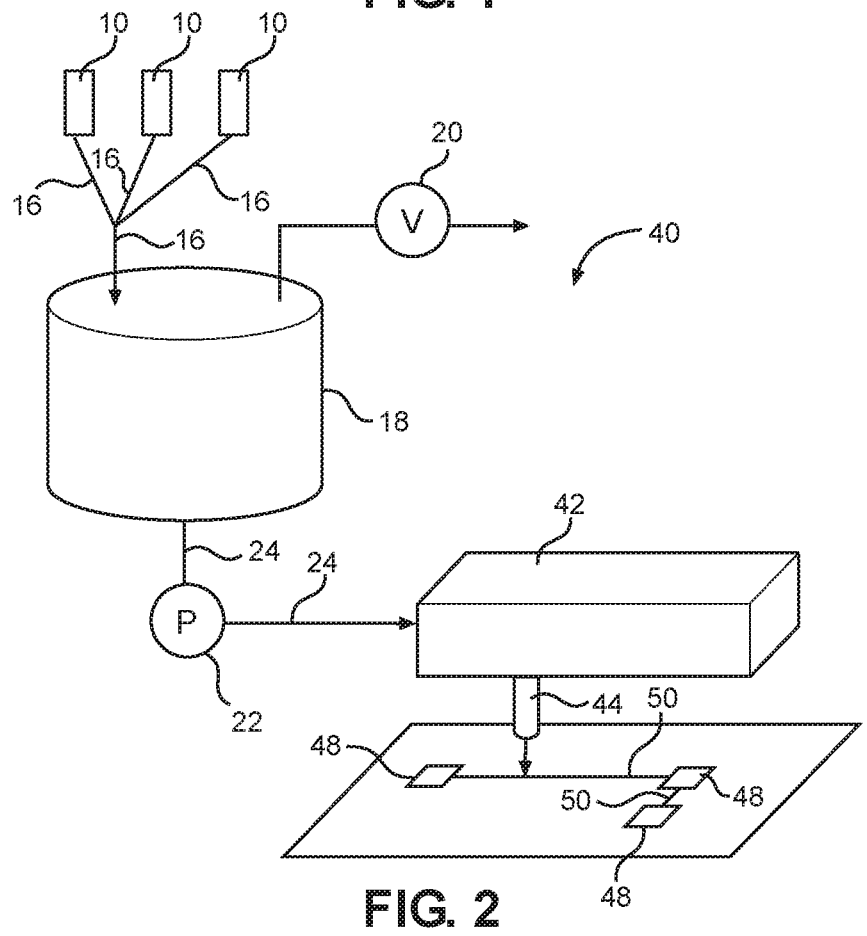
FIG. 2 is a somewhat diagrammatic illustration of a mixer and printer for producing the composite and printing and electrical circuit on a substrate with the composite.

Referring now to FIG. 2, a mixing and printing apparatus 40 is somewhat diagrammatically illustrated. The supply mechanisms 10, the mixer 18, the vacuum pump 20 and the pump 22 and their associated lines are substantially as described above. However, in this illustration, the mixed and degassed composite is supplied by lines 24 to a printer 42. In this embodiment, the composite includes a volatile solvent to reduce viscosity. Prior to adding the solvent the viscosity of the composite in liquid form is up to, but less than, $10^5$ poise, and after adding the solvent, the viscosity of the liquid composite is less than $10^3$ poise, which is appropriate for this particular printer 42 (an A3200 Digital Automation Platform (Aerotech). While a three-dimensional printer is used in this illustration, it will be understood that two-dimensional printers and even one-dimensional printers may be appropriate for some applications.

The printer 42 includes a nozzle 44 that delivers a precise quantity of the composite to a precise position on or near an electrically insulative substrate 46. In this particular illustration, the printer 42 has constructed substantial conductive pads 48 that are connected together by conductive lines 50. Thus, the insulative substrate 46, the pads 48 and the lines 50 represent an electrical circuit board ready for the application of the active and passive components.

Figure 3:
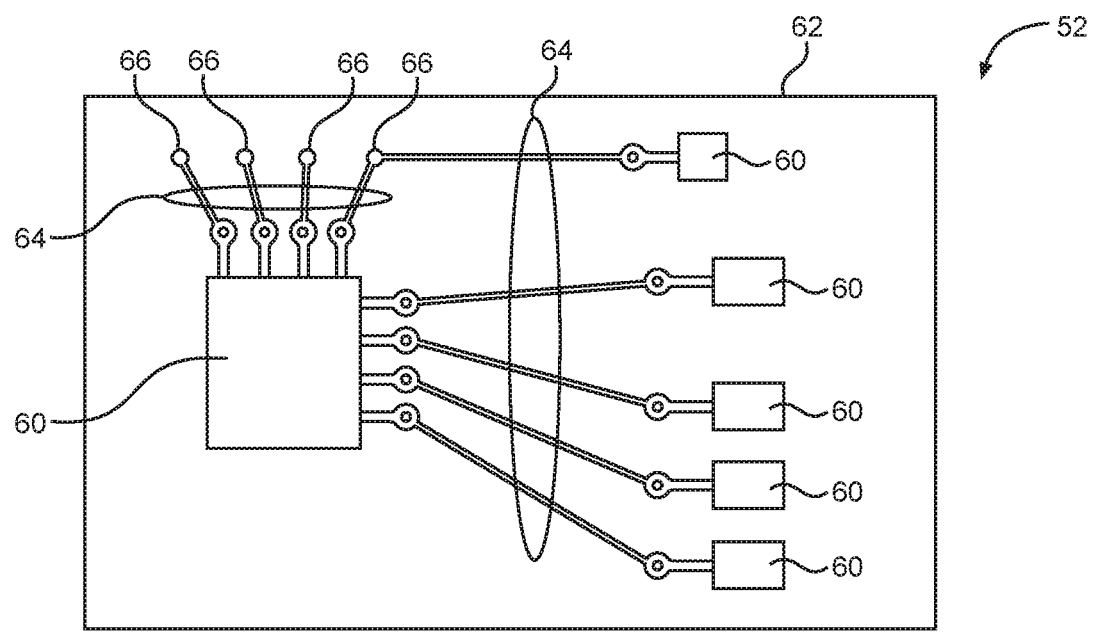
FIG. 3 is an electrical circuit made with the composite of the present invention.
Figure 4:
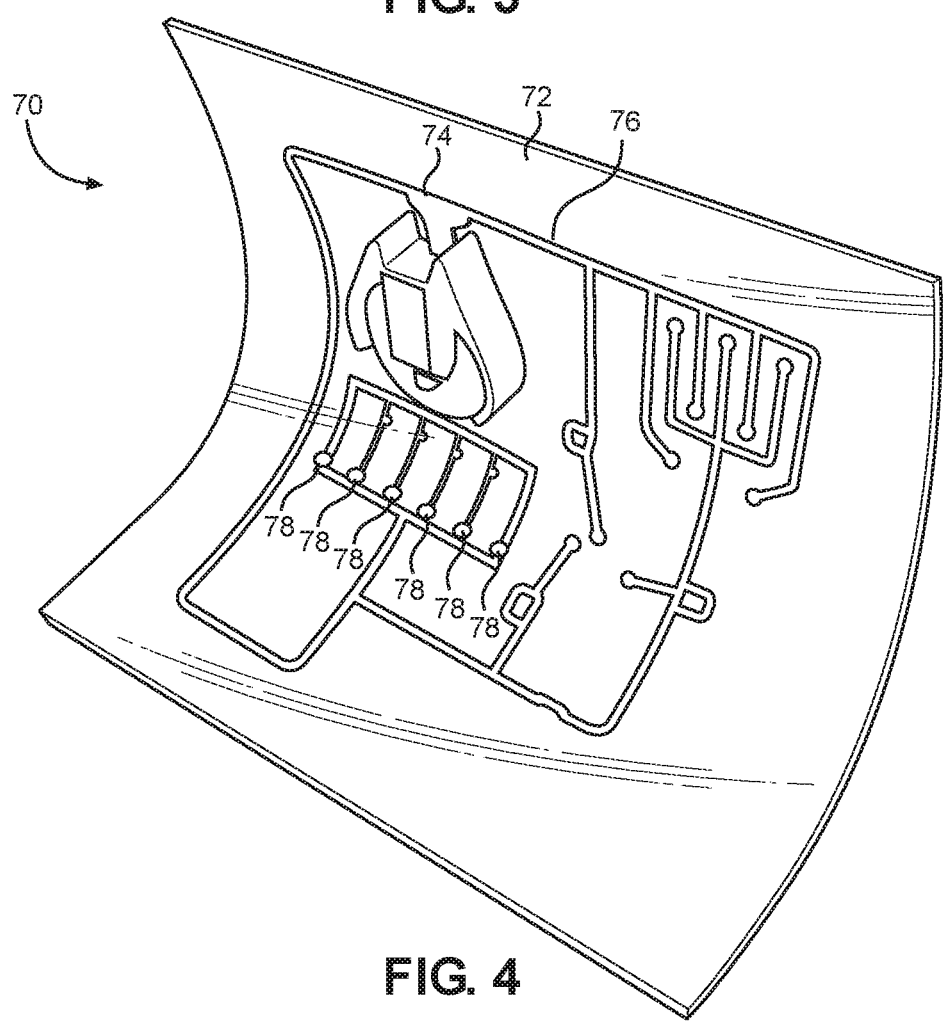
FIG. 4 is an electrical circuit made with the composite of the present invention shown in a flexed position.

A different type of electrical circuit 52 is illustrated in FIG. 3 and it is manufactured using the printer 42 of FIG. 2. In this case, the active and passive components 60 are mounted on the board 62 unconnected to anything. Then, the printer 42 is used to provide the electrically conductive lines 64 that electrically connect the components 60 together. The lines 64 are shaped to provide increased width or thickness at potential points of failure or in places where additional material may be needed. In particular, the lines 64 are increased in size at the junction between each line 64 and each component 60 such that a substantial contact point is created. The lines 64 are a solid (which includes a rubber state), and create reliable, flexible, resilient connections at potential failure points. The printer 42 has also created additional contact points 66 along the line 64 to allow for subsequent manual connection of other components to the circuit 52, and such other components may be entirely external from the circuit 52 and the board 62, FIG. 4 illustrates another circuit 70 that may be constructed using the composite described above. The circuit 70 is created on a very flexible substrate 72 that is made of an insulative material such as PET. In the figure, the circuit is shown curved through approximately 90° of flexing. Lines 76 may be constructed of a composite material as described above and are preferably deposited by a printing apparatus, such as printer 42 of FIG. 2. A plurality of LEDs 78 are connected in a circuit to the battery 74 by the line 76, and thus the LEDs 78 are powered and are shown illuminated in the figure.

Figure 5:
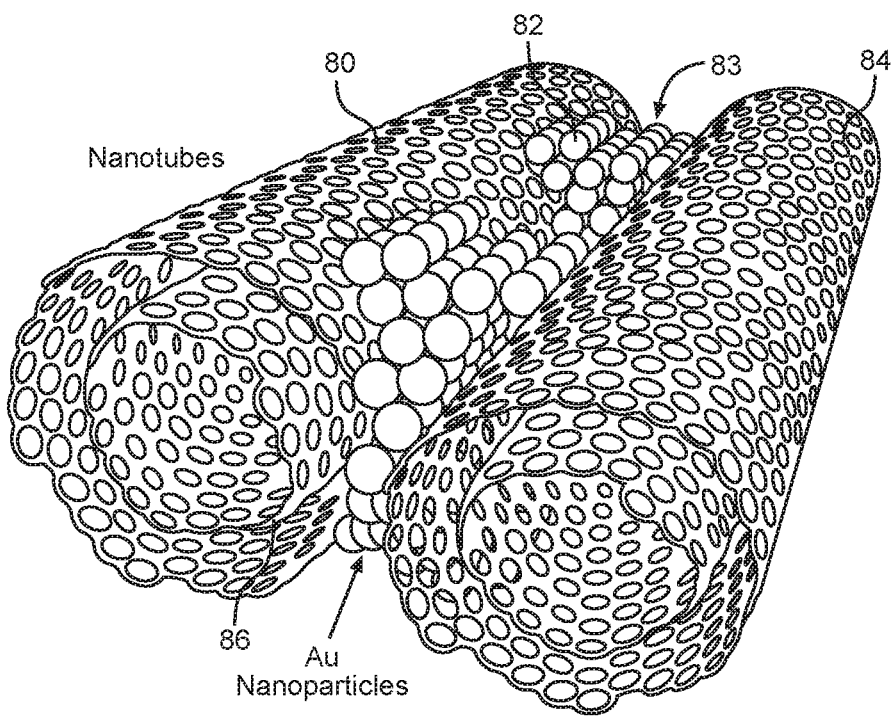
FIG. 5 is a somewhat diagrammatical drawing of two nanotubes positioned sidewall-to-sidewall with gold nanoparticles positioned at the sidewall junction.

Referring now to FIG. 5, a model is shown illustrating two nanotubes 80 and 84 forming a side-by-side junction 83 that is filled by gold nanoparticles 82. In this illustration the nanoparticles 82 have been deposited but not melted. Thus, the nanoparticles 82 are providing a mechanical and electrical connection between the nanotubes 80 and 84, but the junction 83 may be better connected together mechanically and electrically after the gold nanoparticles are melted and a weld is formed between the nanotubes. In this illustration, both nanotubes 80 and 84 are multiwall nanotubes as illustrated by interior nanotube 86.

Figure 6:
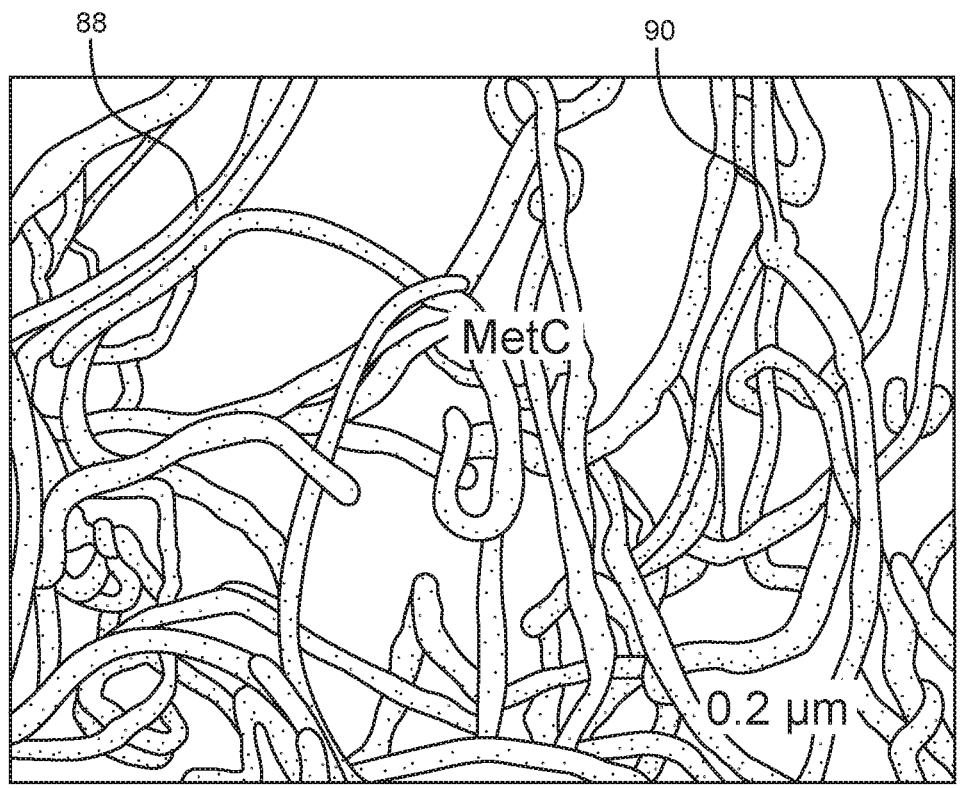
FIG. 6 is a drawing of an image of a nanotube network with the nanotubes coated by metal, gold, nanoparticles.

FIG. 6 is a scanning microscopy image of Pulsed Laser Deposited gold nanoparticles on a carbon nanotube array (network) with a 0.2 micrometer scale shown for reference purposes. In this view it may be seen that side-by-side nanotubes 88 are thoroughly coated and the junction between the side-by-side nanotubes will be highly conductive. Likewise, junctions at points, such as junction 90, are well coated with gold nanoparticles and the junction will be highly electrically conductive. Thus, the overall CNT network will be highly conductive without significant resistance regions at junctions.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A strain resilient electrically conductive material having a conductivity in a solid state is greater than $6\times10^4$ S/cm, said strain resilient electrically conductive material comprising:
   a) metal coated carbon nanotube networks having carbon nanotubes forming side-by-side junctions and point junctions between the carbon nanotubes;
      metal disposed on and around the junctions to provide an electrical contact across the junctions;
   b) a polymer mixed with the metal coated carbon nanotube networks, said strain resilient electrically conductive material comprising metal welds between said junctions.

2. The material of claim 1 wherein the weight percentage of the metal coated carbon nanotube networks is between 50 percent and 90 percent.

3. The material of claim 1 wherein the strain resiliency of the material in a solid state is greater than 34 percent.

4. The material of claim 1 wherein the storage modulus of the material in a solid state is greater than 4.5 GPa.

* * * * *